United States Patent
Nagao et al.

(10) Patent No.: US 6,576,830 B2
(45) Date of Patent: Jun. 10, 2003

(54) SOLAR CELL ROOF STRUCTURE, CONSTRUCTION METHOD THEREOF, PHOTOVOLTAIC POWER GENERATING APPARATUS, AND BUILDING

(75) Inventors: Yoshitaka Nagao, Kyoto (JP); Toshihiko Mimura, Nara (JP); Masahiro Mori, Kyoto (JP); Yuji Inoue, Nara (JP); Satoru Shiomi, Mishima (JP); Ayako Komori, Mishima (JP); Makoto Sasaoka, Kyotanabe (JP); Hidehisa Makita, Kyotanabe (JP); Shigenori Itoyama, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,508

(22) Filed: Dec. 3, 1999

(65) Prior Publication Data

US 2002/0134421 A1 Sep. 26, 2002

(30) Foreign Application Priority Data

Dec. 4, 1998 (JP) .............................. 10-345441
Dec. 1, 1999 (JP) .............................. 11-341972

(51) Int. Cl.[7] ........................ H01L 31/05; H01L 31/042
(52) U.S. Cl. ..................... 136/244; 136/291; 136/293; 52/173.3; 60/641.8; 438/64; 438/66; 438/73; 323/906; 307/149
(58) Field of Search .......................... 136/244, 291, 136/293; 52/173.3; 60/641.8; 438/64, 66, 73; 323/906; 307/149

(56) References Cited

U.S. PATENT DOCUMENTS 5,409,549 A    4/1995  Mori ........................ 136/244
5,496,881 A *  3/1996  Annemaier et al. ......... 524/443
5,513,075 A *  5/1996  Capper et al. .............. 361/773
5,552,185 A *  9/1996  De Keyser ................. 427/358
6,093,884 A *  7/2000  Toyomura et al. .......... 136/244

FOREIGN PATENT DOCUMENTS

| EP | 1006592 | * | 6/2000 |
| JP | 5-239896 | | 9/1993 |
| JP | 7-193948 | | 7/1995 |
| JP | 7-193948 A | * | 7/1995 |
| JP | 8-246627 | | 9/1996 |
| JP | 8-246627 A | * | 9/1996 |
| JP | 2565611 B2 | | 10/1996 |
| JP | 10-8058 | | 1/1998 |
| JP | 10-8058 A | | 1/1998 |
| JP | 10-102687 | * | 4/1998 |
| JP | 10-140943 | * | 5/1998 |
| JP | 11-50622 | * | 2/1999 |

* cited by examiner

Primary Examiner—Alan Diamond
(74) Attorney, Agent, or Firm—Fitzpatrick, Cella, Harper & Scinto

(57) ABSTRACT

In a solar cell roof structure, a photovoltaic power generating apparatus, a building and a method of construction of a solar cell roof, in which a solar cell module is provided above a roof base of a building, an electrical wire for the solar cell module is provided in a space between the solar cell module and the roof base, and the electrical wire extends into a space at the back of the roof base through a through hole provided in the roof base. A base sealing member on the roof base is provided for covering the through hole and an exit is provided in the base sealing member through which the electrical wire extends into the space between the solar cell module and the roof base at a portion of the base sealing member other than a portion just over the through hole of the base sealing member. The base sealing member can include a heat-resisting or fire resistive material on the roof base for covering the through hole.

140 Claims, 12 Drawing Sheets

WIND

SOLAR CELL ROOF STRUCTURE, CONSTRUCTION METHOD THEREOF, PHOTOVOLTAIC POWER GENERATING APPARATUS, AND BUILDING

BACKGROUND OF THE INVENTION

1. Field of the Invention

The present invention relates to a solar cell roof structure, a construction method thereof, a photovoltaic power generating apparatus, and a building.

2. Related Background Art

In recent years, global warming tendency, exhaustion of a fossil fuel, radioactive pollution by accident of a nuclear power plant and nuclear waste have become problems. Therefore, global environment and energy are rapidly attracting attention. Under such condition, a device, such as a solar cell, for collection of solar energy is expected as an inexhaustible and clean energy source. Particularly, the solar cell capable of installing on a roof of a house had been recently proposed and gradually progressed to spread.

As a form of installing the solar cell on the roof of a building, a method for installing a stand or a fixing member on the roof, which had already been built up, to fix a solar cell panel thereon and a method for installing a photovoltaic device on a sheathing roof board as a roofing material by integration with roof tiles and a metal roof have been proposed.

Among them, the solar cell capable of installing on the roof has a structure by which a power is taken from non-light-receiving surface side as shown in FIG. 12. Respective solar cells become a solar cell module 1 by connecting each other with a wiring member such as a cable. The end of this cable is generally connected to a terminal stand named a junction box 37 for parallel connection.

A direct current output of the solar cell module connected to in parallel in this junction box 37 is converted to an alternating current by a power conversion device 38 named inverter to output to a power line 39 in order to use in a loading device in a power receiving site or to run back to a power company.

However, so far, for performing such wiring, a wire to be extended between the solar cell and a space of the sheathing roof board is provided to an inside of a building, where a junction box and a direct current inverter of the solar cell have been installed. Thus, usually, a through hole in a surface of the sheathing roof board is made to pass the electrical wire through this hole. In addition, it was proposed in Japanese Patent No. 2565611 that an air flowing layer (aeration layer) is formed between the sheathing roof board and the roof panel, an output cable of the solar cell is passed through the space to wire in a ridge of the house.

On the other hand, in a fire resistive structure of a building, a fire preventive construction method of the through portion (penetrating portion) of a fire compartment was, for example, proposed in Japanese Patent Application Laid-Open No. 10-8058 as a method of electric wiring by penetrating through a wall. However, this method has an object of which member around the through hole of the wall has a fire-resistive structure. It is the condition that the wiring member such as the cable is provided vertically against the member comprising the through portion, it is the purpose that flame is shut down by the structure of the wiring member, the wiring member is arranged in a narrow space formed by the solar cell module and a flammable roof base member, and it has not been considered for the case that the electrical wire is drawn into the inside of the building via the through hole from this space.

Generally the following method is applied to the house: on the surface of the roof base member (sheathing roof board), a waterproofing underlaying material such as asphalt roofing is put on to prevent rain water by a double layer structure in combination with a roofing material thereon. The roofing material contributes to prevent water caused by condensation on the roofing material. Therefore, opening the through hole in the sheathing roof board needs a careful construction because the position and size thereof are restricted. On the other hand, when an electric wiring material is penetrated through a space made in the ridge, the wiring length becomes longer to increase an electric resistance causing to problems: an electric loss and an excessive cost for the wiring material.

For the building, a performance to prevent fire spreading is required in consideration of leaping of a fire flame from a neighborhood fire. In the case that the solar cell module is used as a cladding assembly such as the roof or the like of the building, if the structure of the roof and the building does not spread it can be said that the performance to prevent fire spreading is high. However, in case of installing the solar cell module on the roof, the back of the solar cell and the common roofing material, which is roofed with, has such electric wiring as the cable to send the electric output generated thereby. Via the through hole, the wiring material is taken into the space at the back of the sheathing roof board. Normally in this portion, a plurality of cables is contained. In an event of an accident, when leaping of a fire flame from a neighborhood fire causes the solar cell module to be exposed to a high temperature to be deformed, the solar cell module may contact directly a plurality of cables resulting in possible heating by heat conduction. Further, the through hole allowing easy flow of air containing more oxygen, in which many cables center, possibly becomes a weak point for fire prevention particularly when the cables are not of a flame-retardant material. Therefore, a method of attaching a metal plate to the back of the solar cell to limit deformation in the least degree has been applied so far. In order to prevent deformation, the mechanical strength of the metal plate should be increased. Consequently, there is a problem that the degree of designing the solar cell module itself is decreased.

SUMMARY OF THE INVENTION

The present inventors have studied on the aforementioned problem to be solved, and as a result, they have found as effective that an origin of fire keeps enough distance from a plurality of cables and a structure thereof capable of preventing flow (aeration) of fresh air from outside as possible, and they have found that the following structure is the best.

According to a first aspect of the present invention, there is provided a solar cell roof structure comprising a solar cell module above a roof base of a building, an electrical wire for the solar cell module provided in a space between the solar cell module and the roof base, the electrical wire extending into a space at the back of the roof base through a through hole provided in the roof base, the solar cell roof structure further comprising a base sealing member on the roof base, for covering the through hole, wherein an exit in the base sealing member through which the electrical wire extends into the space between the solar cell module and the roof base is provided at a portion of the base sealing member other than a portion just over the through hole of the base sealing member.

According to a second aspect of the present invention, there is provided a method of constructing a solar cell roof comprising a solar cell module above a roof base of a building, an electrical wire for the solar cell module provided in a space between the solar cell module and the roof base, the electrical wire being drawn into a space at the back of the roof base through a through hole provided in the roof base, the method comprising providing a base sealing member on the roof base, for covering the through hole, and providing an exit in the base sealing member through which the electrical wire extends into the space between the solar cell module and the roof base at a portion of the base sealing member other than a portion just over the through hole of the base sealing member.

According to a third aspect of the present invention, there is provided a photovoltaic power generating apparatus comprising a solar cell module above a roof base of a building, an electrical wire for the solar cell module provided in a space between the solar cell module and the roof base, the electrical wire extending into a space at the back of the roof base through a through hole provided in the roof base, the apparatus further comprising a base sealing member on the roof base, for covering the through hole, wherein an exit in the base sealing member through which the electrical wire extends into the space between the solar cell module and the roof base is provided at a portion of the base sealing member other than a portion just over the through hole of the base sealing member.

According to a fourth aspect of the present invention, there is provided a building comprising a solar cell module above a roof base of the building, an electrical wire for the solar cell module provided in a space between the solar cell module and the roof base, the electrical wire extending into a space at the back of the roof base through a through hole provided in the roof base, the building further comprising a base sealing member on the roof base, for covering the through hole, wherein an exit in the base sealing member through which the electrical wire extends into the space between the solar cell module and the roof base is provided at a portion of the base sealing member other than a portion just over the through hole of the base sealing member.

According to a fifth aspect of the present invention, there is provided a solar cell roof structure comprising a solar cell module above a roof base of a building, an electrical wire for the solar cell module provided in a space between the solar cell module and the roof base, the electrical wire extending into a space at the back of the roof base through a through hole provided in the roof base, wherein a base sealing member comprising a heat-resisting or fire resistive material is provided on the roof base, for covering the through hole.

According to a sixth aspect of the present invention, there is provided a method of constructing a solar cell roof comprising a solar cell module above a roof base of a building, an electrical wire for the solar cell module provided in a space between the solar cell module and the roof base, the electrical wire being drawn into a space at the back of the roof base through a through hole provided in the roof base, the method comprising providing a base sealing member comprising a heat-resisting or fire resistive material on the roof base, for covering the through hole.

According to a seventh aspect of the present invention, there is provided a photovoltaic power generating apparatus comprising a solar cell module above a roof base of a building, an electrical wire for the solar cell module provided in a space between the solar cell module and the roof base, the electrical wire extending into a space at the back of the roof base through a through hole provided in the roof base, wherein a base sealing member comprising a heat-resisting or fire resistive material is provided on the roof base, for covering the through hole.

According to an eighth aspect of the present invention, there is provided a building comprising a solar cell module above a roof base of the building, an electrical wire for the solar cell module provided in a space between the solar cell module and the roof base, the electrical wire extending into a space at the back of the roof base through a through hole provided in the roof base, wherein a base sealing member comprising a heat-resisting or fire resistive material is provided on the roof base, for covering the through hole.

DETAILED DESCRIPTION OF THE PREFERRED EMBODIMENTS

Figure 1A:
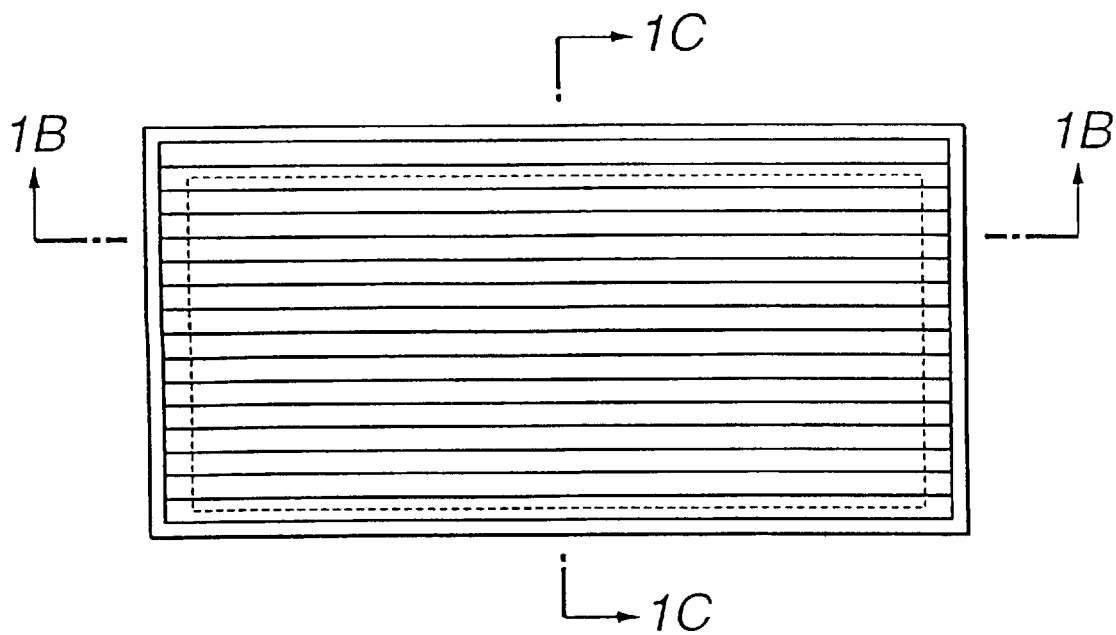
FIG. 1A is a schematic plan view showing an example of the roof in accordance with the present invention.

According to the configuration of the present invention described above, waterproofing performance can be increased. In addition, by preventing fresh air to flow in via the through hole, oxygen supply to a space between the solar cell module and the roof base is decreased to allow fire prevention performance of the roof to be improved. Such performance becomes prominent in use of a heat-resisting material or a fire resistive material for a sealing member. Even if a fire deforms the solar cell module, the contact of a kindling coal with the electrical wire in the upper part of the through hole can be prevented. Such performance becomes prominent in the case where an exit to the space between the solar cell module and the roof base from the sealing member of the electrical wire is provided in a portion of the sealing member other than a portion just over or directly above the through hole of the sealing member. If this configuration is adopted, the electrical wires are easily arranged in parallel or almost parallel to the roof base. Thus, a distance between the solar cell module and the roof base can be shortened to provide an advantage in that there is less possibility that a gap, that is assumed to be formed around the exit by moves of the wires, reaches the through hole.

In the present invention, the sealing member (hereinafter, sometimes referred to as "base sealing member") preferably comprises a plurality of sealing members. Among such a plurality of sealing members, at least two may comprise the same material. For example, a plurality of members comprising the same material is combined and thus used as the sealing member in order to increase the degree of freedom of operation. Of course, different materials can be used.

Furthermore, the electrical wires between the solar cell module and the through hole are preferably almost in contact with the roof base surface. According to such a configuration, the space between the solar cell module and the roof base could be made narrower. When the electrical wires are arranged without contact with the back surface of the module in parts other than a part for connecting to the solar cell module, even if the solar cell module is heated, it becomes preferably difficult for heat to conduct the electrical wires.

A preferable embodiment of configuring the sealing member with a plurality of sealing members is: (1) the sealing member has at least a first sealing member and a second sealing member, the second sealing member surrounds the electrical wires around the through hole in the roof base to cover the through hole and its neighboring part, (2) the sealing member comprises at least a first sealing member attached to the peripheral edge part of the through hole to limit aeration of the through hole and the second sealing member covers the through hole, (3) the sealing member has at least a noncombustible second sealing member covering the through hole and a flame-retardant first sealing member arranged in the space between the second sealing member and the roof base, and (4) the sealing member comprises at least a second sealing member covering the through hole, a first sealing member arranged around the through hole and on the roof base side of the electric wiring, and a third sealing member arranged around the through hole and on the solar cell module side of the electric wiring (preferably, the first sealing member and the third sealing member are integrally formed).

In the configuration described in the (2), attaching the first sealing member to the peripheral edge part prevents contact of the electrical wires with the peripheral edge part, and by this, damage of the electrical wires caused by friction with the peripheral edge part can be prevented. If the part between the peripheral part of the through hole and the electrical wires has a part of the sealing member, such effect can also be obtained by making the peripheral part of the through hole without any contact to the electrical wires. Preferably, the sealing member (or a part of the sealing member) between the peripheral part of the through hole and the electrical wires is consisting of a material softer than the peripheral part. For example, putty, clay, organic polymeric materials can be used for the sealing member.

Further, the sealing member used in the present invention is, preferably, deformable. If the deformable sealing member is used, the sealing member deforms to follow the arrangement of the electrical wires in operation to make it easy. Furthermore, as the sealing member, a malarial may be used which sets (hardens or cures) with the elapse of time. Use of the setting material as the sealing member allows accomplishing simultaneously easy operation and stability after the operation. Such materials are exemplified by putty, clay, etc.

It is preferable that at least a part of the sealing member comprises a heat resisting material or a fire-resistive material. It is more preferable that the heat resisting material or the fire-resistive material is arranged to fill the through hole. It is further preferable that the whole of the sealing member comprise the heat resisting material or the fire-resistive material. The fire-resistive material is more preferable as compared with the heat resisting material. If a material resistive against a very high temperature is used as the heat resisting material, it can be equal to the fire-resistive material.

It is preferable that at least a part of the sealing member has non-permeability. It is more preferable that a part having non-permeability covers the through hole. As such sealing member, a member having a non-permeable layer is preferably used. It is more preferable that the entire sealing member is non-permeable.

It is preferable that the roof base has a slope and is inclined and the exit from the sealing member of the electric wiring to the space between the solar cell module and the roof base is provided in the direction downward the slope with regard to the through hole. By such a configuration, the possibility of water running along the electrical wires to invade via the through hole to the back of the roof base becomes low.

It is preferable that the electrical wires are arranged in an arcuate shape (circular shape) from the through hole to above the through hole. By such a configuration, the electrical wires can be easily and naturally arranged in parallel or almost parallel to the roof base surface.

It is preferable that the solar cell module used in the present invention is a solar cell module which is integral with a roofing material having a support means of a non-combustible material (a metal plate). By such a configuration, deformation of the solar cell can be limited to the minimum and the effect of the present invention can be increased. When such a configuration is adopted, no falling down of a kindling coal penetrating through the support means is realized. In such viewpoint, it is further preferable that the support means of a noncombustible material is located in whole surface or almost whole surface of the back of the solar cell module.

Herewith, the preferred embodiments of the present invention will be described below with reference to the drawings.

Figure 1B:
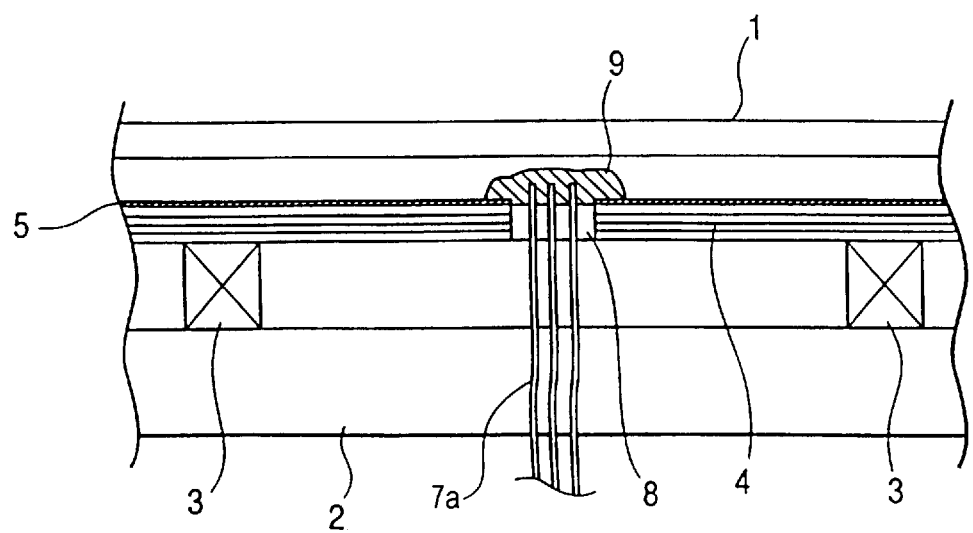
FIG. 1B is a schematic partial sectional view taken along the line 1B—1B of FIG. 1A.
Figure 1C:
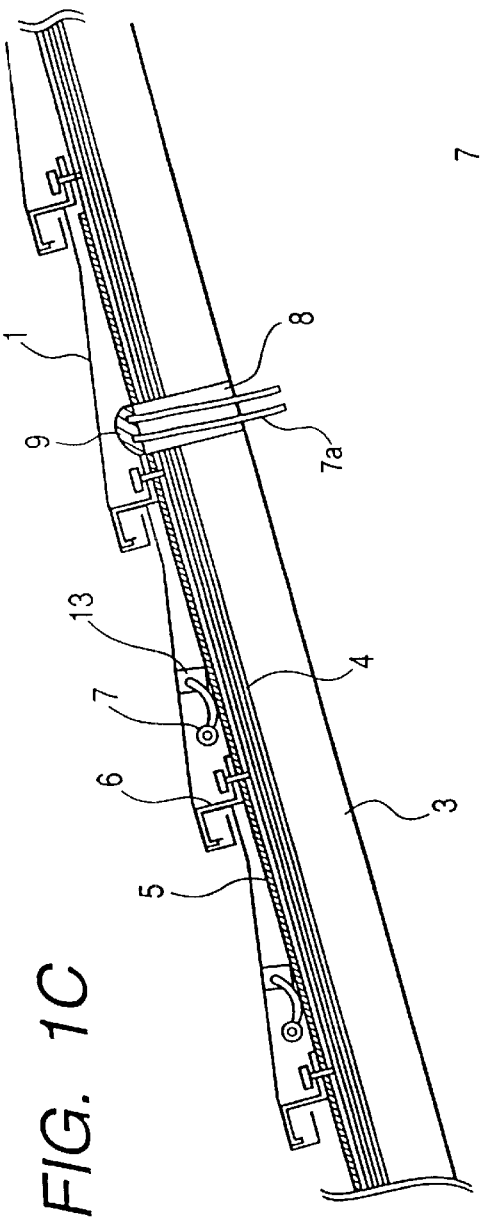
FIG. 1C is a schematic partial sectional view taken along the line 1C—1C of FIG. 1A.
Figure 2:
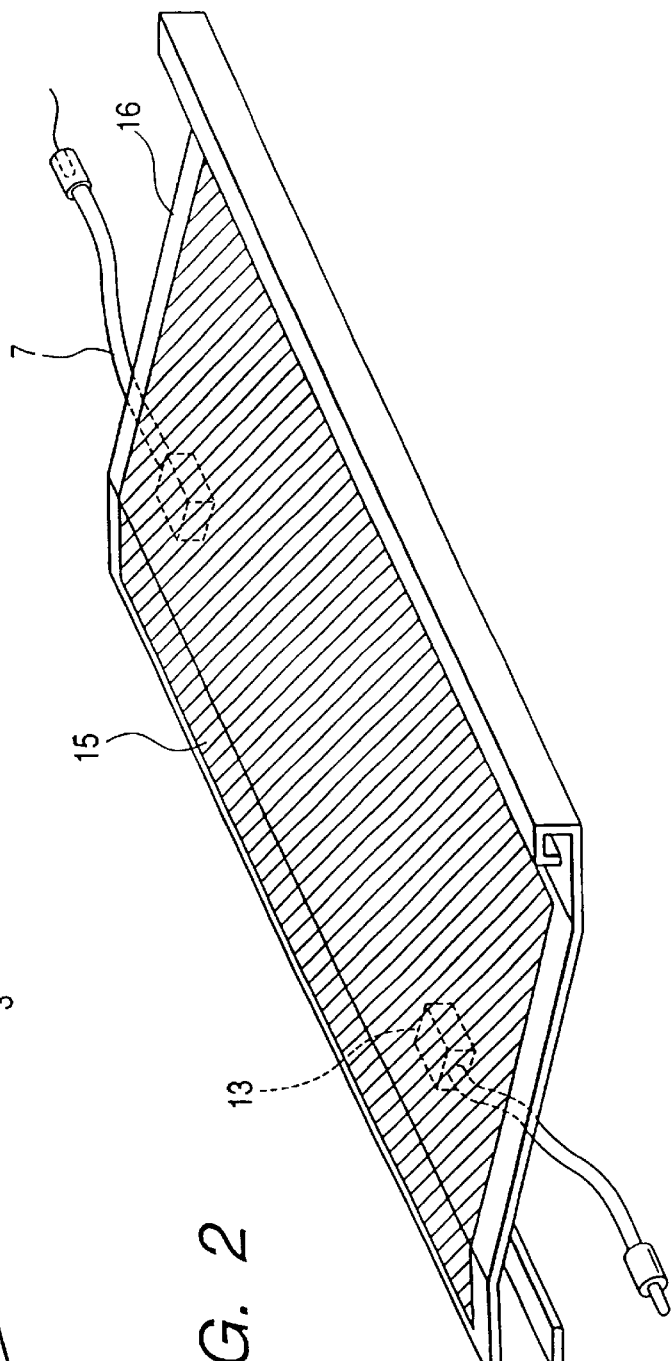
FIG. 2 is a schematic perspective view showing an example of the solar cell module used in the roof structure in accordance with present invention.

FIGS. 1A to 1C, based on the structure of the present invention, are views of an embodiment of application of the solar cell module 1 to a roof as the roofing material. FIG. 1A is a constitutional view of the roof, FIG. 1B is a 1B—1B sectional view (partial) of FIG. 1A, FIG. 1C is a 1C—1C sectional view (partial) of FIG. 1A. FIG. 2 is a schematic perspective view showing an embodiment of the solar cell module used for the present invention. To the back surface of the solar cell module, as shown in the FIG. 2, a junction box 13 to send a power has been attached. To the junction box 13, an electric wiring member 7 has been connected. As shown in the FIG. 1B, a rafter 3 is fixed to the purlin 2 of a building. On the purlin, the sheathing roof board is put to make the roof base surface. Generally, a waterproof underlaying material 5 is put thereon. A fixing member named as a clip 6 fixes a roofing material 1. Between the roof base and the roofing material 1, there are the wiring members 7 connected each other and wires 7a in the roof for connecting wires from outside. On the roof base surface, the outside of the wall body of the building has the through hole as a drawing means 8 for drawing wiring members from the outside. Wiring members 7 pass through the through hole 8 to connect to the wiring 7a in the roof. On the through hole 8, sealing means (sealing member) 9 is provided.

Solar Cell Module 1

A preferred instance of the solar cell module 1 used for the present invention, as shown in the FIG. 2, is exemplified by that in which the solar cell 15 is attached to the supporting means 16. It is possible to use a glass plate and a film as supporting means 16 to support in the side of light receiving surface of the solar cell 15 and to use a steel plate as the supporting means 16 as shown in the FIG. 2 to support in the side of non-light-receiving surface of the solar cell 15. In order to increase strength, the supporting means 16 may have a frame such as aluminium frame in the surrounding part. The roofing material 1 used for the present invention is installed on the sheathing roof board 4 described before and in addition, can be installed on the conventional roofing material and the roofing material having the function of the roof. Besides, the solar cell 15 of the roofing material 1 used for the present invention is not restricted; for example, as the solar cell made by using a silicon semiconductor, monocrystalline silicon solar cell, polycrystalline silicon solar cell, microcrystalline silicon solar cell, and amorphous silicon solar cell can be used; as the solar cell made by using a chemical compound semiconductor, group III-V compound solar cell, group II-VI compound solar cell, group I-III-VI compound solar cell can be used. Furthermore, the solar cell made by combination of the semiconductor can be used.

The solar cell used for the present invention is preferably the amorphous silicon solar cell. The amorphous silicon solar cell can be prepared as a thin film on a film substrate and an electroconductive substrate resulting in decrease in weight of the solar cell itself. In addition, the amorphous silicon solar cell shows a good output characteristic under a high temperature in comparison with crystalline solar cells and therefore, it is best for using on the top of the roof where a high temperature occurs. Further, the amorphous silicon solar cell of which substrate is prepared by using the electroconductive substrate shows a higher structural strength and flexibility to allow a degree of freedom for shape and installation on the roof surface even if there are camber and concave upward.

Further, using not glass for surface protecting material of the solar cell, but a weatherable film, and using a metal steel plate, as used for a metal roof, for a reinforcing material of the back surface allows bending like the metal roof to form such as a folded plate shape, a batten seam shape, and a horizontal roofing shape and provides the waterproof function of the roofing material. This preferably makes the total cost of installing in a new building and a reformed building lower. Furthermore, the reinforcing material of the back surface made from a metal plate allows shutting fire from outside and less degree of deforming. Resulting in fire prevention performance.

Sheathing Roof Board 4

A sheathing roof board 4 is a base board installed continuously on the whole surface of the roof for operation of the roofing material and has a function as a construction receiving a positive load on the roof. The sheathing roof board 4 is generally exemplified by plywoods, cemented excelsior boards, cemented chip boards, plaster boards, glass wool boards, concrete, and ALC panel, of which a part has heat insulating performance. An embodiment has become a roof panel integrally with a rafter. As the sheathing roof board 4 of the present invention, that capable of fixing the roof material 1 can be used by selection.

Waterproof Underlaying Material 5

A waterproof underlaying material 5 is used to improve waterproof performance of the roof, when the roofing material 1 is roofed on the top surface of the sheathing roof board 4. If perfect waterproof performance can be realized by the roofing material 1 and the slope of the roof, the waterproof underlaying material 5 is not necessary. However, generally, underlaying is operated as secondary waterproof means. As the waterproof underlaying material 5, asphalt roofing and asphalt felt are frequently used, however, there is no restriction to these materials.

Wiring Member 7

The wiring member 7 used as the electrical wire in the present invention is not particularly limited. The structure of the wiring member is preferably the cable structure, but the flat type wire or the ribbon wire may be used. The wiring member is selected and used so as to satisfy heat resistance, low temperature resistance, mechanical strength, electrical insulation, water resistance, oil resistance, abrasion resistance, acid resistance, and alkali resistance required according to the use environment.

Specifically, the wire which can be preferably used herein includes 600V polyethylene insulated cables (EV, EE, CV, CE) of JIS C3605 standard, 600V grade ethylene-propylene (EP) rubber insulated cables (PN, PV) of JIS C3621 standard, 600V grade polyvinyl chloride insulated and sheathed (round type, flat type) cables (VVR, VVF) of JIS C3342 standard, class 1, class 2, class 3, or class 4 600V rubber insulated cabtyre cables (1CT, 2CT, 3CT, 4CT) of JIS C3327 standard, class 2, class 3, or class 4 600V rubber insulated chloroprene cabtyre cables (2RNCT, 3RNCT, 4RNCT) of JIS C3327 standard, class 2, class 3, or class 4 600V ethylene-propylene (EP) rubber insulated chloroprene cabtyre cables (2PNCT, 3PNCT, 4PNCT) of JIS C3327 standard, or 600V grade polyvinyl chloride insulated and sheathed vinyl cabtyre cables of JIS C3312 standard.

In the present embodiment, the exit in the sealing member described below through which the electrical wire extends over the roof base surface is offset with regard to the location just over the through hole.

Through Hole 8

The through hole 8 is a hole provided for drawing the wiring member to the back side of the sheathing roof board, the roof base or the like.

Sealing Means (Sealing Member) 9

The sealing means (sealing member) 9 used in the present invention is, as shown in the FIG. 1B, installed to cover the through hole 8 as the wire-drawing in means, prevent air flow from the through hole 8, and cover the wiring material 7 in view of the solar cell module 1 being the roofing material. As sealing member 9, a heatproof sealing material not combustible by exposure to a high temperature and noncombustible members such as various kinds of metal plates, rock wool, and glass wool are preferably used. The heat resisting sealing has a large degree of freedom of shape to allow filling in a space between cables material resulting in preferable sealing means. Further, in order to provide waterproofing performance, flame-retardant surface protecting material may be applied to the surface of the heat resisting sealing material. Furthermore, covering the surface with a metal plate and using the heat resisting sealing material for the space between cables may become embodiments of the sealing means in combination of the members. When the metal plate such as aluminium having a relatively low melting point is used as the metal plate, in view of prevention of deformation, its thickness should be fully considered.

According to the distance between the solar cell module and the wire laying means, a member such as silicone rubber having heat resisting performance and flame-retardancy can be used. As such a member, a material excellent in ability to prevent airflow is preferable.

As members having heat-resisting performance and flame-retardancy, a heat-resisting putty commercially sold is easily available and thus is preferably used.

As members having the heat-resisting performance and flame-retardancy, a member that comprises various materials commonly known can be appropriately used by selection. For example, fluorine-containing polyimide material, carbon-based fire resistive material such as silica, zircon, alumina, spinel, magnesia, dolomite, calcium oxide, calcium carbonate, glass fiber, silicon carbide, silicon nitride, graphite carbon or the like, a metal with a high melting point such as graphite, tungsten, and molybdenum or the like are used independently or as a mixture.

EXAMPLES

The present invention will be described in detail with reference to examples. The following examples are to be considered in all respects as illustrative and not restrictive.

Example 1

In the present example, a solar cell module 1 is made by serial connection of amorphous silicon solar cells 15, as shown in the FIG. 2, of which back surface has a galvalume steel sheet 16 to be sealed with a weatherable resin. The solar cell module 1 is bent to make it to horizontal roofing shape and a plurality thereof is connected the sheathing roof board. Below will be the detailed description.

Figure 3:
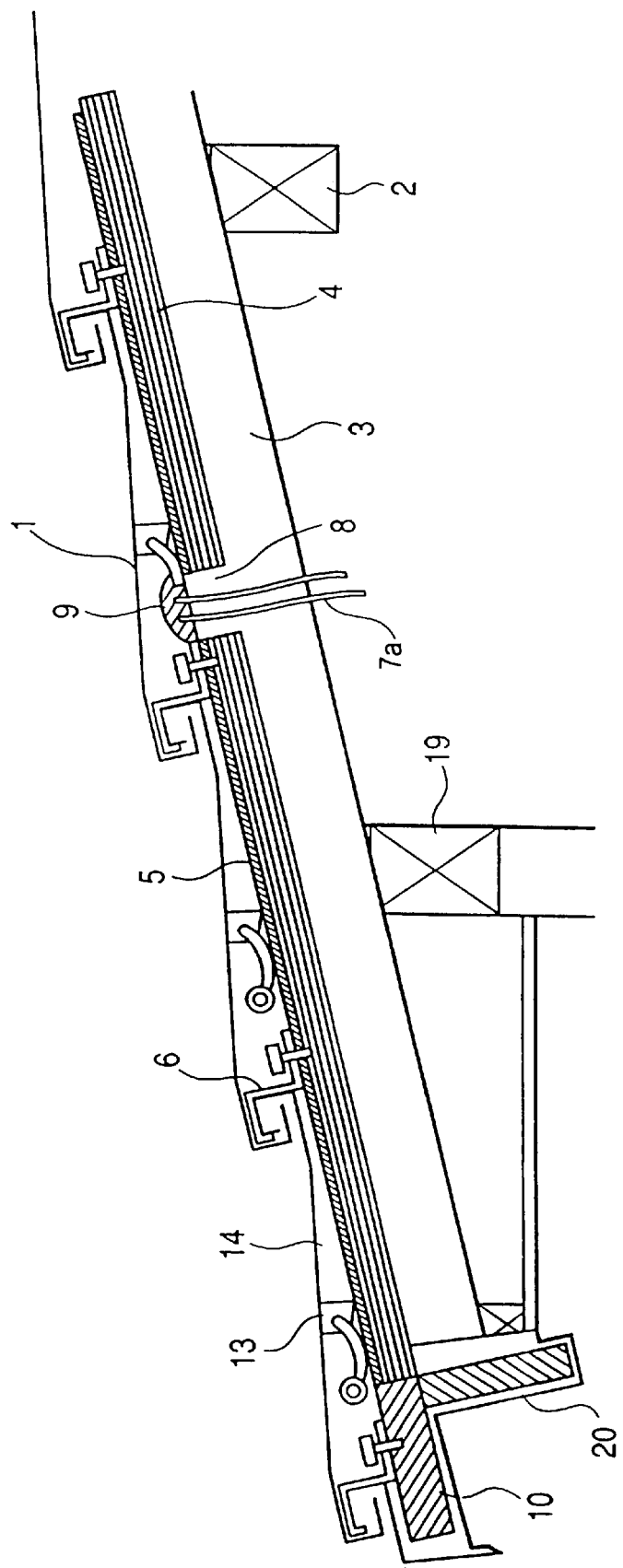
FIG. 3 is a schematic sectional view showing an example of the solar cell roof structure in accordance with present invention.
Figure 4A:
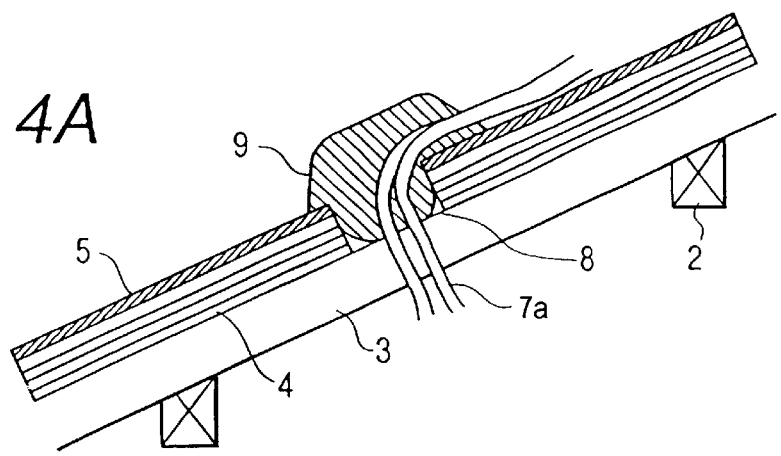
FIG. 4A is a schematic sectional view showing a leading-in opening of the solar cell roof structure of Example 1.
Figure 4B:
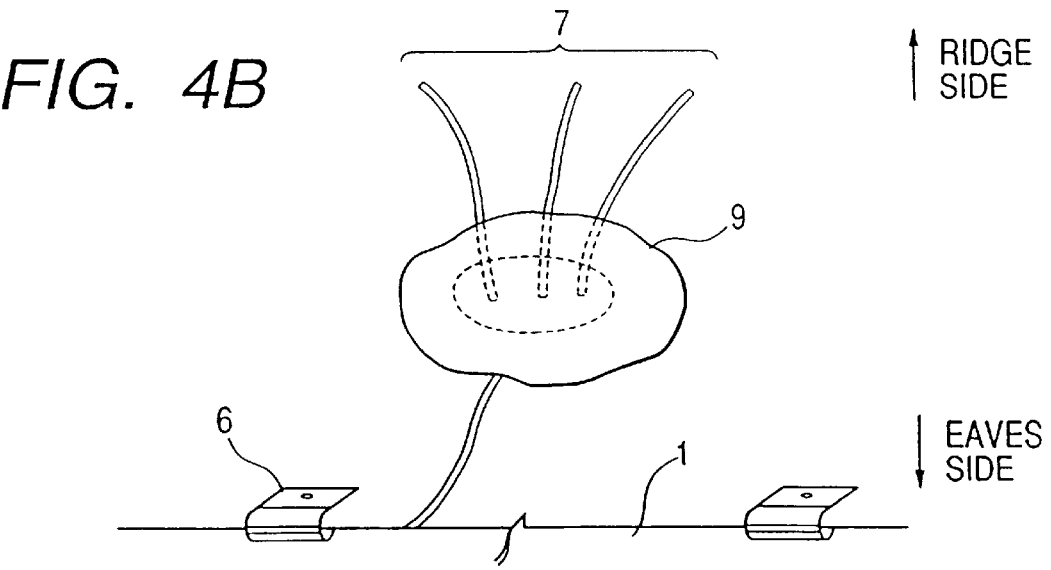
FIG. 4B is a schematic perspective view showing a leading-in opening of the solar cell roof structure of Example 1.
Figure 12:
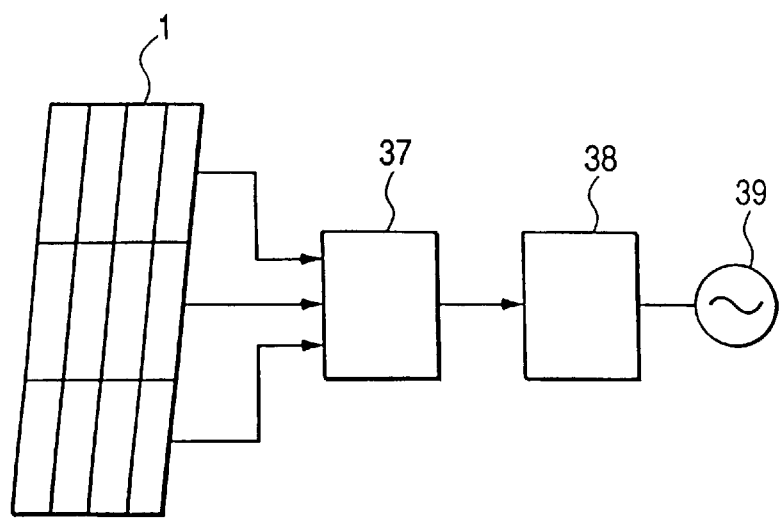
FIG. 12 is a schematic constitutional view of the photovoltaic power generating system to which the present invention is applied.

In order to configure the roof of a building, a pole plate 19, purlin 2, and rafter 3 are arranged as shown in FIG. 3 and 12 mm plywood for structure is installed as the sheathing roof board 4 thereon to fix to the rafter 3 with drill screws. On the surface of the sheathing roof board 4, in order to assure water proofing performance, asphalt roofing, which is the waterproof underlaying material 5, is installed to fix to the sheathing roof board 4 with staples. On the sheathing roof board 4, the through hole (diameter 90 mm) 8, which is the wire-laying means, is opened. A CV cable 7a, which is a wiring member, is previously passed from the bottom part to the top part of this sheathing roof board 4 via this through hole 8 and laid in the position from which positive electrodes of the group of solar cell modules serially connected appear and the position from which negative electrodes appear. As shown in FIGS. 4A and 4B, around the through hole 8, the CV cable 7a is arranged to contact with the surface of asphalt roofing 5. Upon it, the heat resisting material 9 (manufactured by NITTO KASEI CO., LTD., commercial name Plaseal, NF-5DS) is applied to cover the cable in the position with a radius of 80 mm from the center of the through hole.

Then, a connecting cable to send an output of the solar cell is connected to the solar cell module in serial connection each other and fixed with a fixing member named a clip 6, as shown in FIG. 2.

After roofing by such process, the CV cable for extension is connected to the junction box installed on the wall of the inside of the building.

According to example, easy electric connection can be easily performed, and wiring can be shortened, thereby reducing an electric power loss caused by a wiring resistance and resulting in enhanced reliability.

Figure 5:
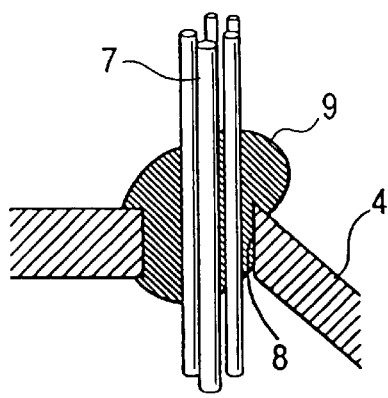
FIG. 5 is a schematic perspective view showing an example of a conventional fire preventive construction method for a through portion of a fire compartment.

As shown in FIG. 5, in a method using the heat resisting sealing material 9 around the cable 7 in the through hole 8 according to a conventional fire prevention method for the through portion of a fire compartment, the heat resisting sealing material 9 cannot be satisfactorily fixed and fire preventive performance cannot be satisfactorily realized, in the case where the roof base 4 is as thin as the sheathing roof board made by using a plywood for structure, the space between the sheathing roof board 4 and the roofing material 1 is narrow, and the cable 7 having a curved part in the through hole 8 is used.

Figure 6A:
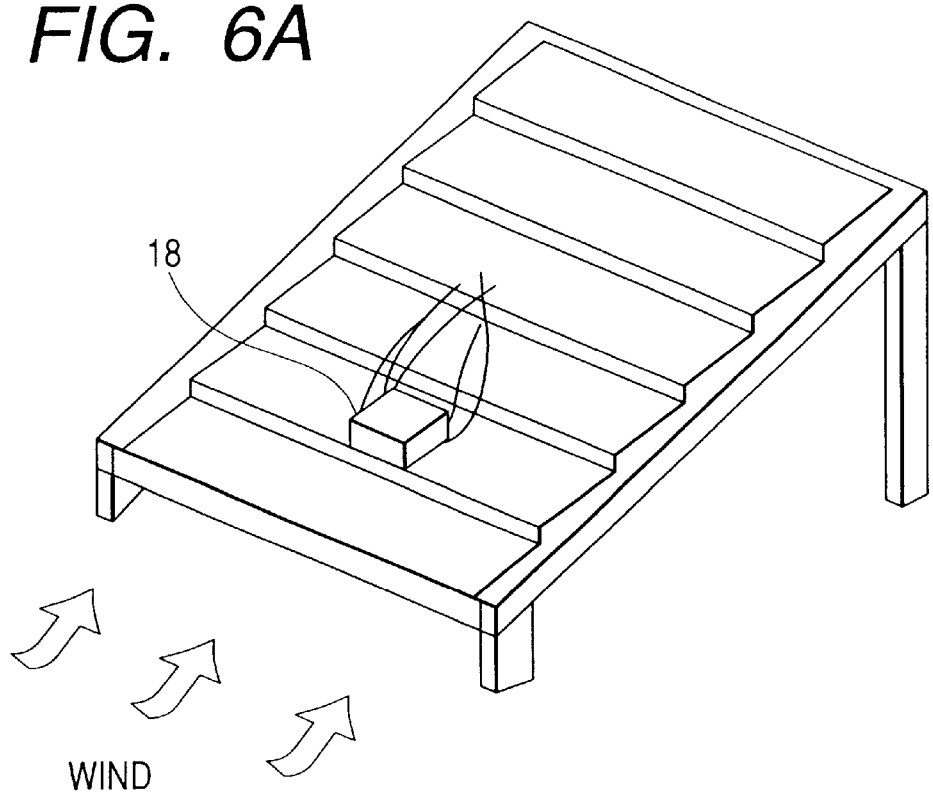
FIG. 6A is a schematic perspective view showing an example of a fire protecting performance test.
Figure 6B:
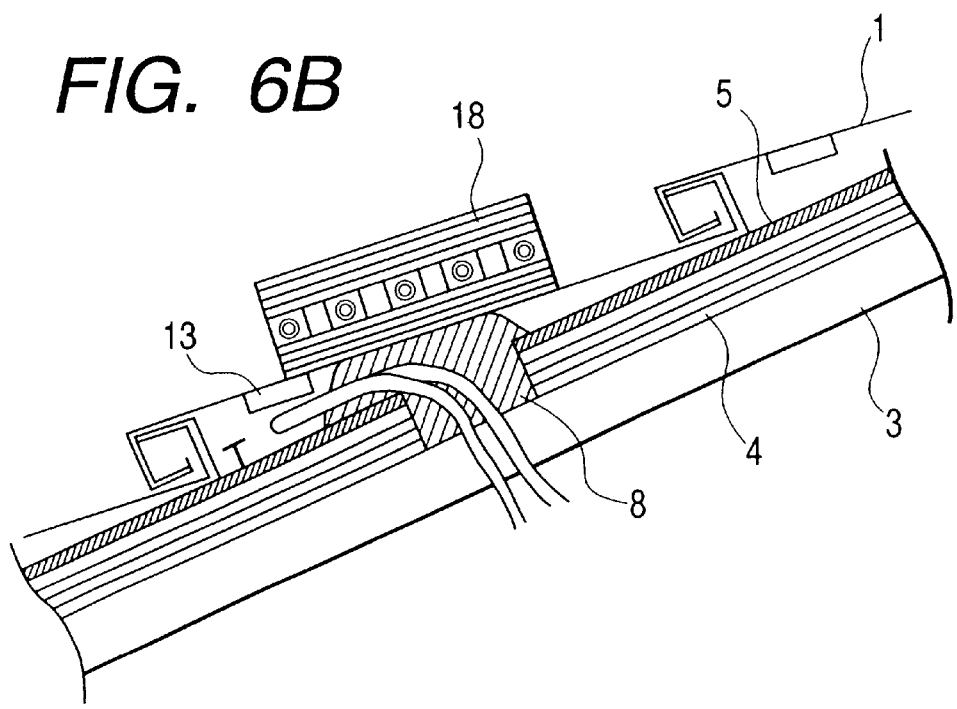
FIG. 6B is a schematic sectional view of the periphery of a kindling coal portion of the fire protecting performance test.

According to the method described in the present invention, as shown in FIGS. 6A and 6B, an imitation roof was fabricated, a kindling coal 18 made from about 550 g of Douglas fir was loaded on the roofing material 1 upon the top of the through hole 8, and a wind of 3 m/sec was blown for burning to conduct a fire prevention test for a roof. After the test, almost no change of the sheathing roof board was observed yielding an excellent result for fire prevention. The result is considered as yielded on the basis that air flow from the through hole 8 was prevented nearly completely and that by applying endothermic action of the heat resisting sealing material 9 in a place in which cables 7 are collected, such as in the through hole 8, heating of the sheathing roof board around the through hole 8 was prevented. This test proves practically the effectiveness of the present invention.

Example 2

In replacing the solar cell module made by using an amorphous silicon solar cell of Example 1, a glass-encapsulated solar cell module made by using a crystalline solar cell was prepared in this Example and an aluminium frame of the module was installed on the sheathing roof board by using a mounting hardware for fixing the aluminium frame.

Figure 7A:
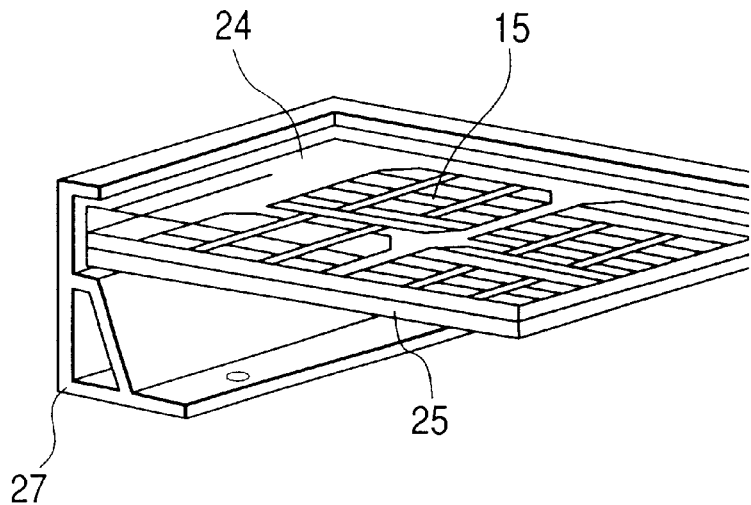
FIGS. 7A and 7B are schematic perspective views of a solar cell module used in Example 3.
Figure 7B:
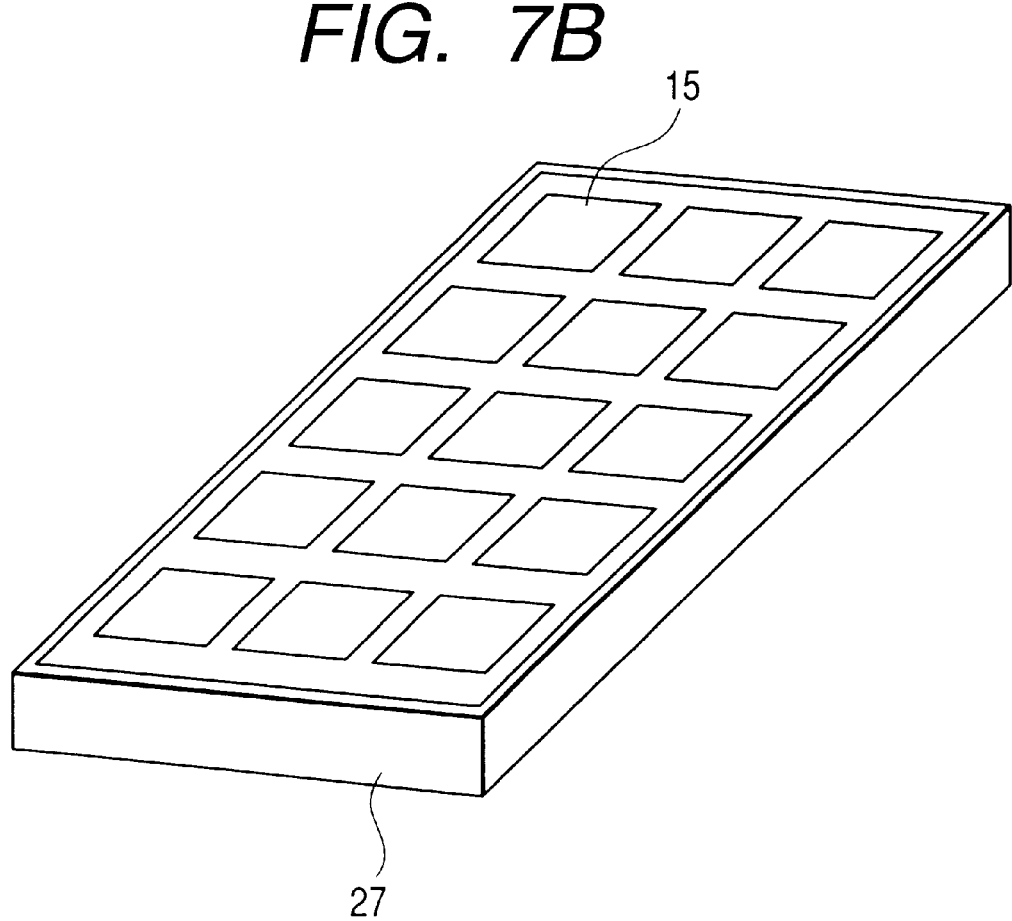

As explanation will be made in detail with reference to FIGS. 7A and 7B in the following. The solar cell 15 was a crystalline silicon solar cell with a grid electrode. Fifteen crystalline silicon solar cells were connected serially, and glass 24 and an aluminium foil were attached to the surface and the back surface, respectively, of a humidity resistive fluorine resin (Tedlar (Du Pont made)/aluminium foil/Tedlar) to make a back surface film 25 and to seal with EVA 26. Then, to four sides, aluminium frames 27 as a reinforcing material were adhered and fixed by using an adhesive to prepare the crystalline silicon solar cell module.

Figure 8A:
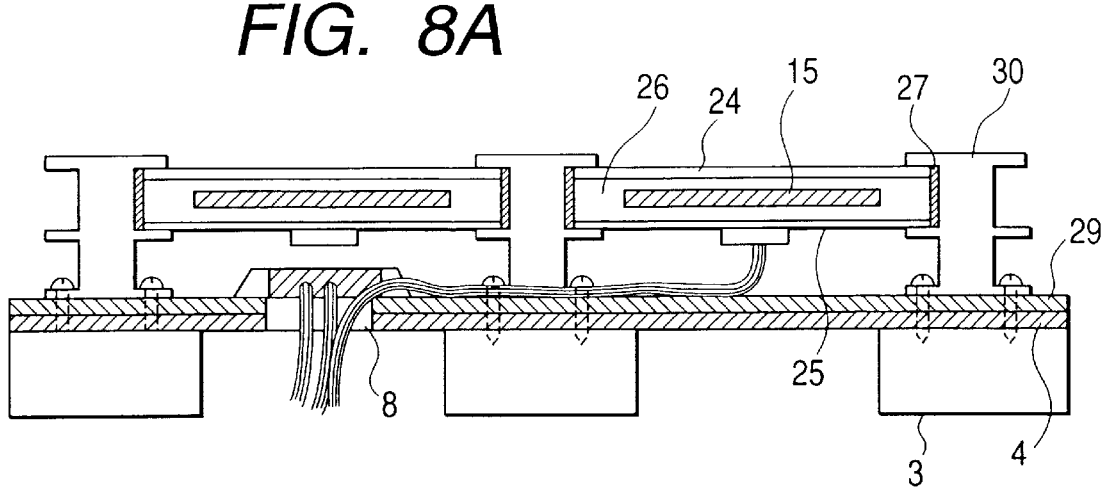
FIG. 8A is a schematic sectional view of the solar cell roof structure of Example 2.

By using the cemented excelsior board as the sheathing roof board 4 and asphalt roofing 29 as a roof underlaying material, the fixing member 30 was installed to fix the aluminium frame of the solar cell module thereon to fix the solar cell module as shown in FIG. 8A. The output wires of the solar cell module and the grounding line connected to the aluminium frame part were installed inside the building from installing means (the through hole) 8 on the roof surface.

Figure 8B:
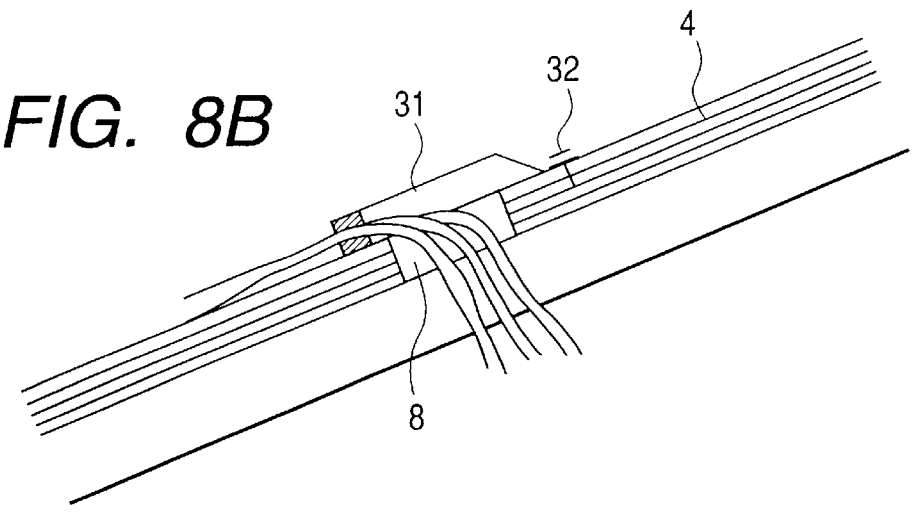
FIG. 8B is a schematic sectional view showing the sealing means of the solar cell roof structure of Example 2.
Figure 8C:
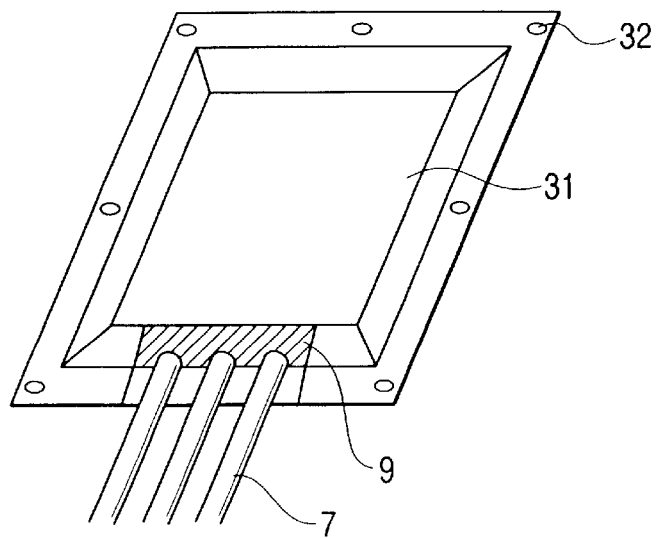
FIG. 8C is a schematic perspective view showing the sealing means of the solar cell roof structure of Example 2.

In the installing means, as shown in FIGS. 8B and 8C, a zinc-plated steel board 31 was processed, a heat resisting material (manufactured by NITTO KASEI CO., LTD., commercial name Plaseal, NF-5DS) 9 was attached to a part thereof through which the cable passes, and the cable 7 was installed by pressing to enter the part from the lower part of the through hole.

According to the present example, the electric connection is easily operated and the wiring length can be reduced to reduce a wiring resistance resulting in effective use of the electric power generated by the solar cell.

The fire prevention test for the roof as shown in Example 1 was conducted according to the present example yielded an excellent fire prevention performance as like as that of Example 1. This may be because supply of fresh air was prevented by almost preventing airflow from the through hole 8 resulting in limiting combustion.

Wiring the cable 7 from the lower part of the through hole 8 does not allow invasion of water along the cable in the building to provide an excellent water proofing performance.

Example 3

Figure 9:
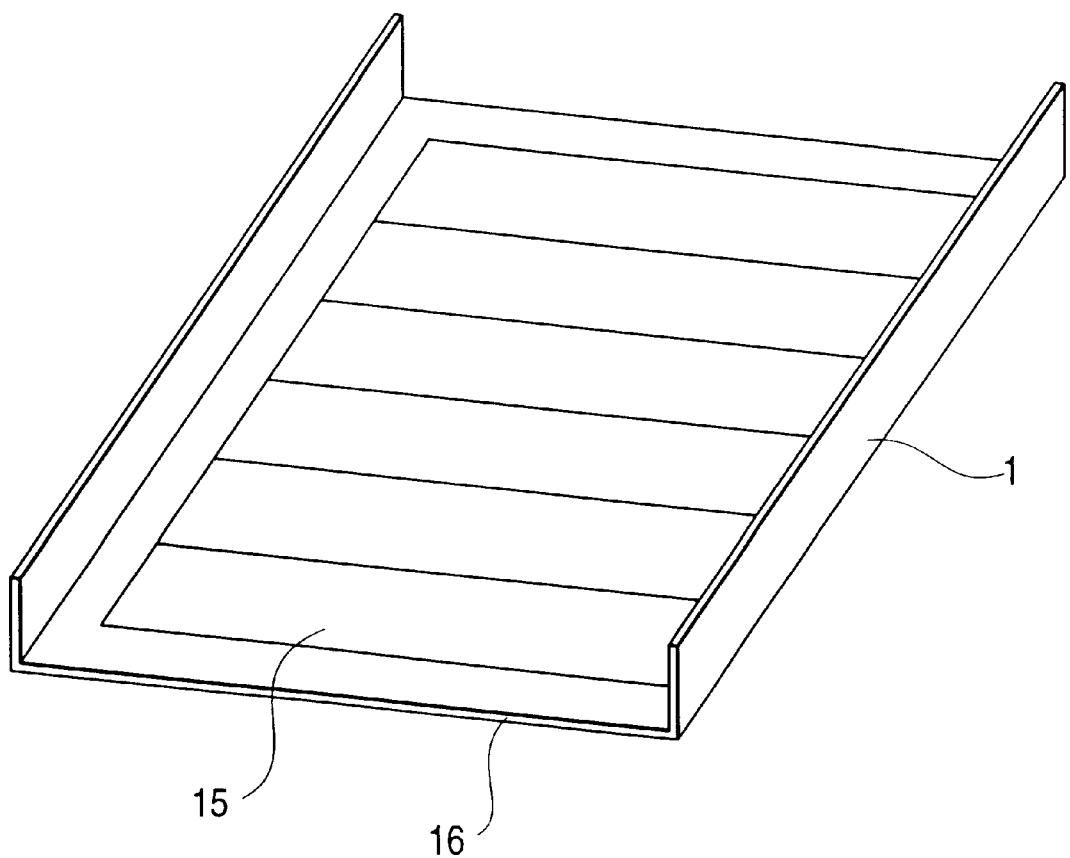
FIG. 9 is a schematic perspective view showing a solar cell module used in Example 3.

In the present example, the solar cell module having a layering configuration as like as that of Example 1 was processed by bending to make the shape of batten seam roof as the roofing material 1, as shown in FIG. 9, of which a plurality is connected to the sheathing roof board 4. Details will be given below.

Figure 10A:
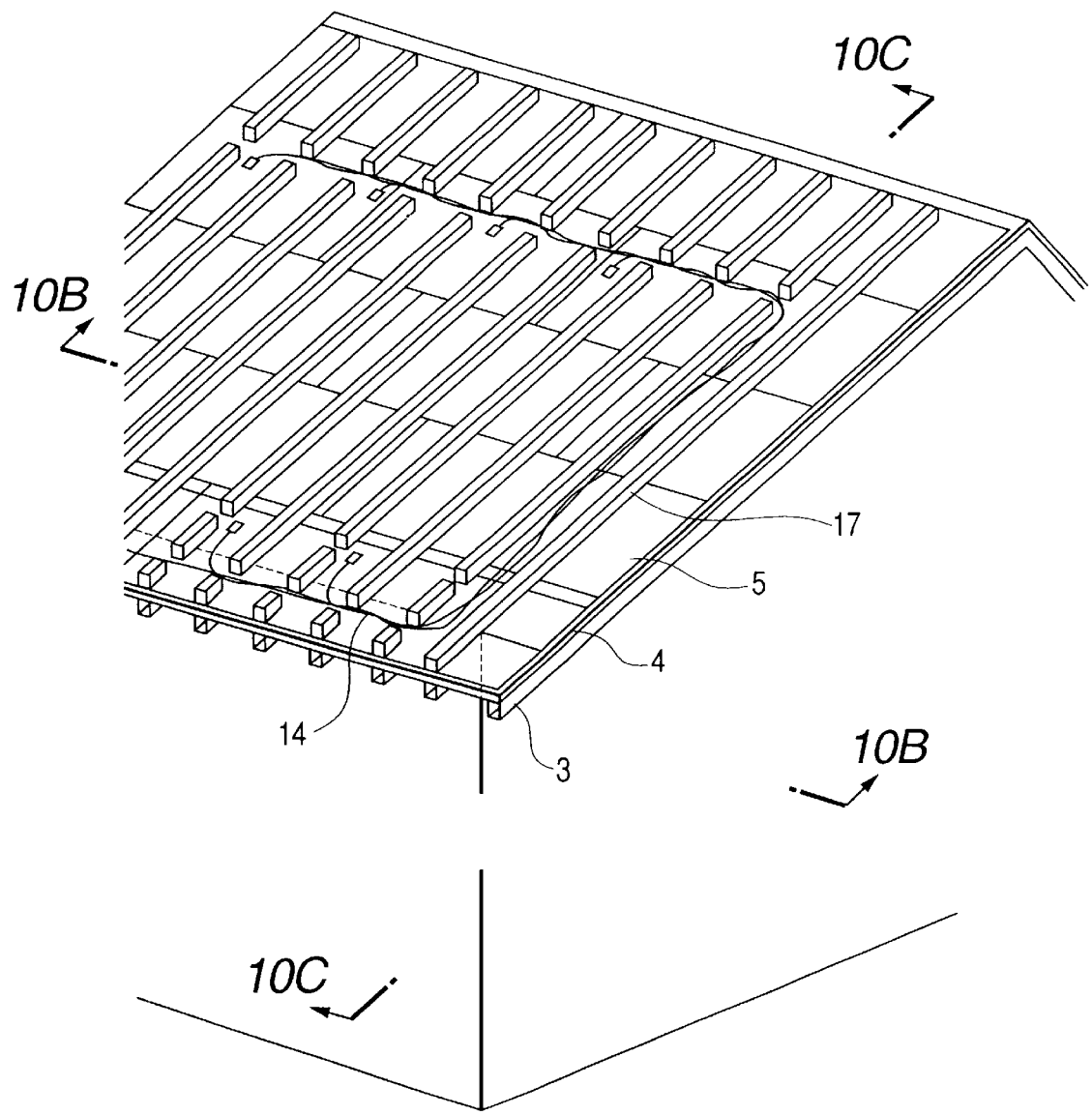
FIG. 10A is a schematic perspective view showing the inside of the solar cell roof structure of Example 3.
Figure 10B:
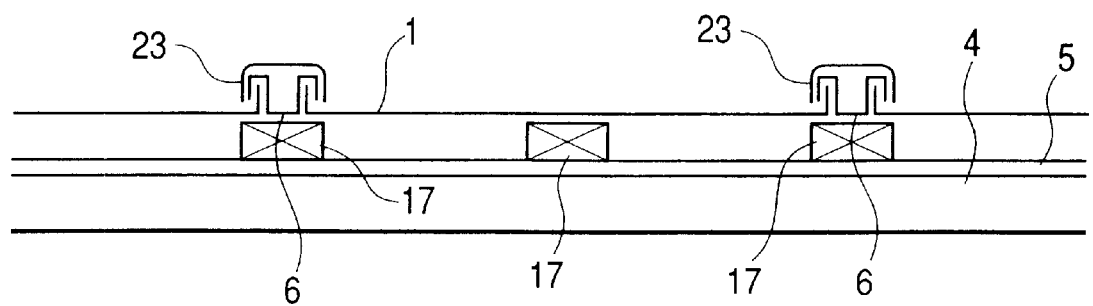
FIG. 10B is a schematic sectional view showing the solar cell roof structure of Example 3 taken along the line 10B—10B of FIG. 10A.
Figure 10C:
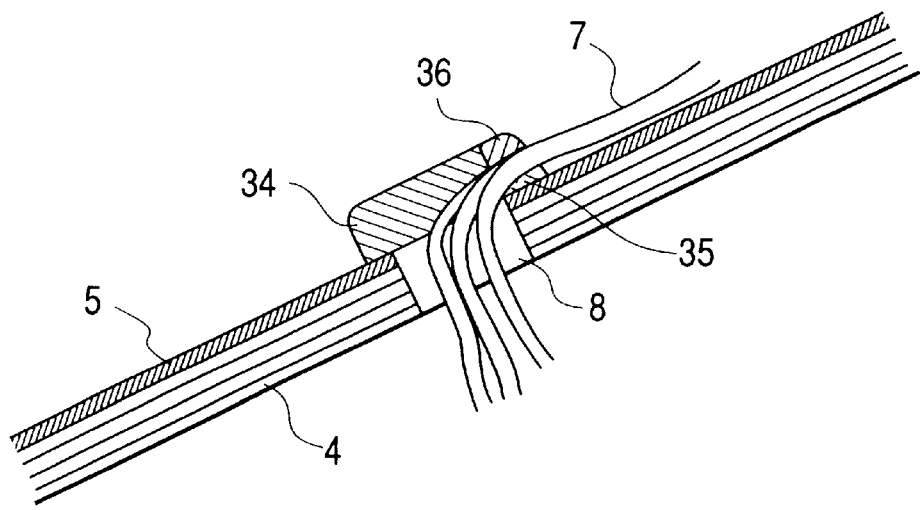
FIG. 10C is a schematic sectional view showing the leading-in opening of the solar cell roof structure of Example 3 taken along the line 10C—10C of FIG. 10A.

In order to configure a gable roof in a building as shown in FIGS. 10A to 10C, a pole plate, a purlin, and a rafter 3 were arranged, on which the cemented excelsior board was arranged the sheathing roof board 4 to fix the rafter 3 with drill screws. In order to assure waterproofing performance the asphalt roofing as underlaying material 5 was fixed to the surface of the sheathing roof board 4 with staples. Upon this, sash bars 17 were attached in a vertical direction with almost a half pitch of the width direction of the roofing material 1. A part in which the junction box of the solar cell module interferes with sash bars 17 to make a recessed shape. In addition, the through hole 8, which is installing means, was opened in the sheathing roof board 4. Then, the CV cable 7, a wiring member, for extension, is previously passed from the bottom part to the top part of this sheathing roof board 4 via this through hole 8 and laid in the position from which positive electrodes of the group of solar cell modules serially connected appear and the position from which negative electrodes appear. Beneath the cables installed, the first heat resisting sealing material (manufactured by NITTO KASEI CO., LTD., commercial name Plaseal, NF-5DS) 35 as the first sealing means was attached in a bar shape to fit to the underlaying material 5 around the through hole 8. Over the first sealing means, the second heat resisting sealing material 34 as the second sealing means, and the third heat resisting sealing material 36 as the third sealing means (materials of either sealing materials are same as the first sealing material) were installed to cover the cable 7 in the position with a radius of 80 mm from the center of the through hole 8.

After this step, a connecting cable to send an output of the solar cell module is connected in serial connection each other and fixed with a fixing member named clip 6 as shown in FIG. 10B. A batten cap 23 was fitted to the part between respective roofing materials.

After roofing by such manner, the CV cable for extension was connected to the junction box installed on the wall of inside of the building.

According to the present example, easy electric connection is possible, and wiring length reduces resulting in improvement of reliability.

In installing the cable from the through hole in the higher position (ridge side), water can be prevented to invade in the inside of the building along the cable, because the first heat resisting sealing material 35 has been installed under the cable. Besides, fire-preventing performance is same as Example 1.

Figure 11A:
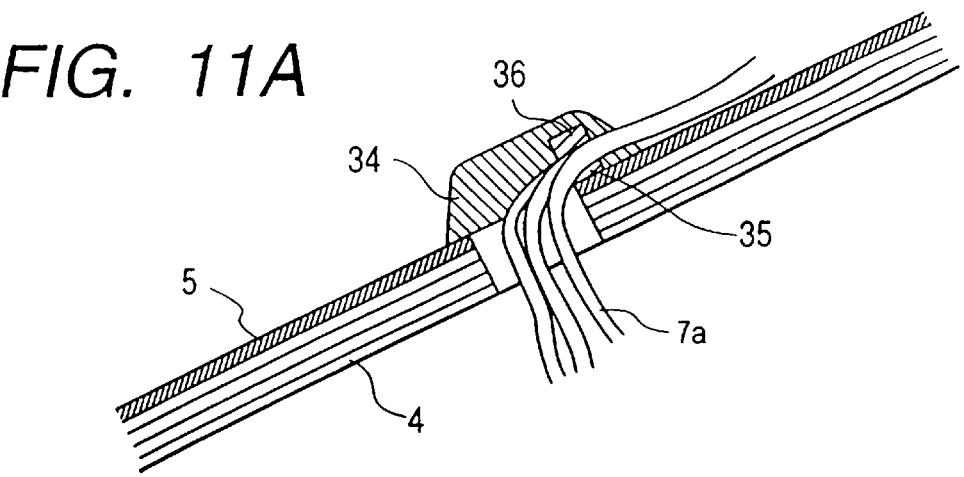
FIGS. 11A and 11B are schematic sectional views showing the leading-in opening of the other solar cell roof structure of Example 3.
Figure 11B:
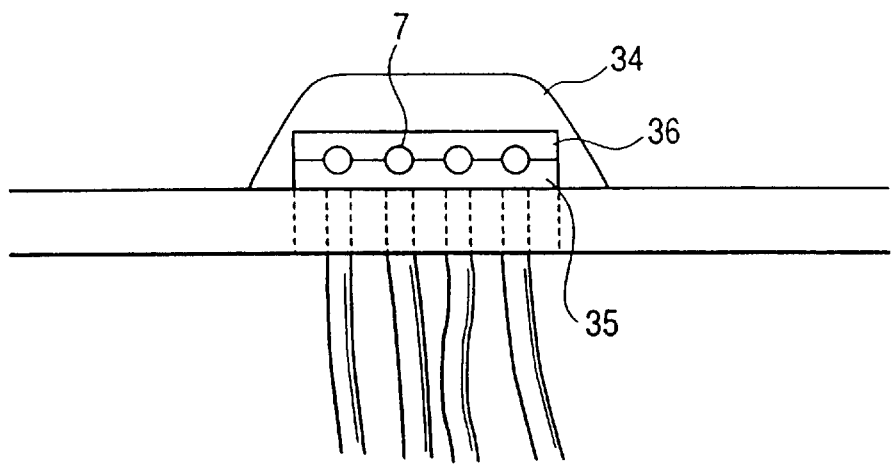

In the present example, the heat resisting sealing material 35 was installed under the cable. As shown in FIGS. 11A and 11B, when the whole around the through hole 8 is covered with the second heat resisting sealing material 34, a bushing material such as resin and rubber and various corking material are used for sealing means 35 and 36 to replace to the first heat resisting sealing material and the third heat resisting sealing material.

Example 4

The present example has the same installing mode as that of Example 3 differing from the through hole part 8. Below are the details.

The part of through hole 8, which is the installing means, is opened in the sheathing roof board 4. As shown in FIGS. 13A to 13D, the first heat resisting sealing material (manufactured by NITTO KASEI CO., LTD., commercial name Plaseal, NF-5DS) 35 as the first sealing means was attached to the peripheral part of the through hole part 8, a CV cable 7 for extension, which is a wiring member, is previously passed from the bottom part to the top part of this sheathing roof board 4 via this through hole 8 and laid in the position from which positive electrodes of the group of solar cell modules serially connected appear and the position from which negative electrodes appear. Upon it, the second heat resisting sealing material 34 (quality was the same as that of the first sealing material) as the second sealing means is installed to cover the cable 7 in the position with a radius of 60 mm from the center of the through hole 8.

Then, while connecting a solar cell module a connecting cable to send an output of the solar cell is connected in serial connection each other and fixed with a fixing member named clip 6 as shown in FIG. 2. A batten cap was fitted to the part between respective roofing materials.

After roofing by such manner, the CV cable for extension was connected to the junction box installed on the wall of inside of the building.

According to the present example, easy electric connection is possible, and wiring length reduces resulting in improvement of reliability.

In installing the cable 7 from the through hole 8 in the higher position (ridge side), even if the second sealing means 34 cannot realize waterproofing performance, water can be prevented to invade in the inside of the building along the cable 7, because the heat resisting sealing material 35 as the first sealing means has been installed under the cable 7. Besides, fire preventing performance is excellent as same as Example 1.

Figure 13A:
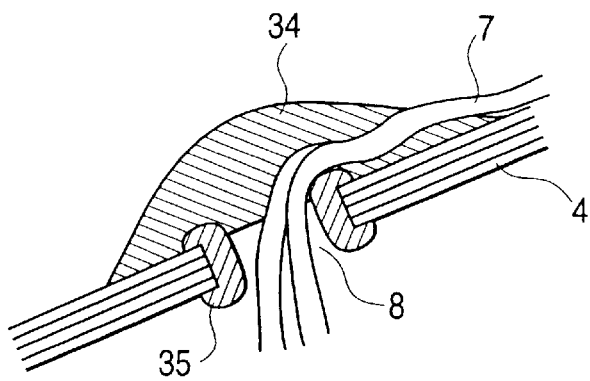
FIG. 13A is a schematic sectional view of the sealing means of Example 4.
Figure 13B:
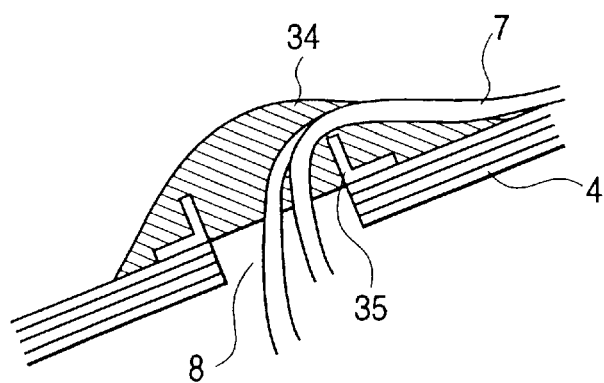
FIGS. 13B and 13C are schematic sectional views of the other sealing means of Example 4.
Figure 13C:
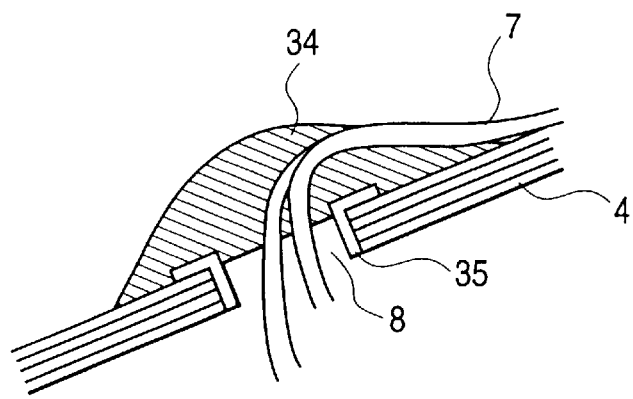
Figure 13D:
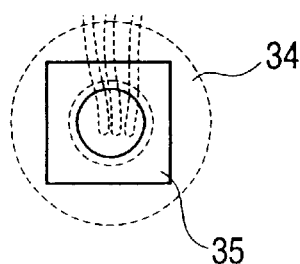
FIG. 13D is a partial plan view corresponding to FIG. 13B.

In the present example, the heat resisting sealing material was applied as the second sealing means. However, a waterproofing sealing material and a round-hole cover used in an electric piping system shown in FIGS. 13B and 13C provide the same effect. When covered by a fire resistive sealing material, its heat resisting temperature may be slightly low; and its quality may be a resin, however, a non-combustible material such as a metal or a material having fire preventive performance than flame-retardancy is preferable.

As described before, the following effect is exhibited by the solar cell roof structure and the construction method thereof of the present invention.

(1) Waterproofing performance is improved by providing sealing means in the through hole, in the roof base, for drawing in of the cable.

(2) In a place narrow as the space between the solar cell module and a space of the sheathing roof board, the present invention can be used to improve fire preventive performance of the place where wiring members such as cables comprising an organic material are collected, is easy to operate, and can increase the degree of freedom of design of the solar cell module itself.

(3) Waterproofing performance is further improved by improving the drawing-in method of wiring members and the sealing means beneath the wiring members.

What is claimed is:

1. A solar cell roof structure, comprising:
   a solar cell module above a roof base of a building;
   an electrical wire for the solar cell module provided in a space between the solar cell module and the roof base, the electrical wire extending into the space through a through hole provided in the roof base; and
   a base sealing member on the roof base, for covering the through hole, wherein
      an exit in the base sealing member through which the electrical wire extends into the space between the solar cell module and the roof base is provided at a portion of the base sealing member other than a portion over the through hole, and wherein
         the base sealing member seals an opening of the through hole through which the electrical wire extends, so as to prevent air flow via the through hole between the space between the solar cell module and the roof base and a space at a back of the roof base.

2. The solar cell roof structure according to claim 1, wherein the base sealing member comprises a plurality of sealing members.

3. The solar cell roof structure according to claim 2, wherein at least two of the plurality of sealing members comprise the same material.

4. The solar cell roof structure according to claim 1, wherein the electrical wire between the solar cell module and the through hole is substantially in contact with the roof base.

5. The solar cell roof structure according to claim 1, wherein the base sealing member comprises at least first and second sealing members, and wherein the second sealing member surrounds the electrical wire at the peripheral portion of the through hole and covers the through hole and the peripheral portion thereof.

6. The solar cell roof structure according to claim 1, wherein the base sealing member comprises at least a first sealing member provided at the peripheral edge portion of the through hole so as to suppress aeration through the through hole and a second sealing member covering the upside of the through hole.

7. The solar cell roof structure according to claim 1, wherein the base sealing member comprises at least a noncombustible second sealing member covering the upside of the through hole and a flame-retardant first sealing member provided in a gap between the second sealing member and the roof base.

8. The solar cell roof structure according to claim 1, wherein the base sealing member comprises at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

9. The solar cell roof structure according to claim 8, wherein the first and the third sealing members are formed integrally.

10. The solar cell roof structure according to claim 1, wherein at least a portion of the base sealing member comprises a heat-resisting or fire resistive material.

11. The solar cell roof structure according to claim 1, wherein the base sealing member comprises a heat-resisting or fire resistive material.

12. The solar cell roof structure according to claim 1, wherein at least a portion of the base sealing member has non-permeability.

13. The solar cell roof structure according to claim 12, wherein the base sealing member comprises a non-permeable layer.

14. The solar cell roof structure according to claim 1, wherein the roof base is inclined, and wherein the exit in the base sealing member through which the electrical wire extends into the space between the solar cell module and the roof base is provided in a direction downward the inclination with regard to the through hole.

15. The solar cell roof structure according to claim 1, wherein the electrical wire is arranged in a circular shape in and over the through hole.

16. The solar cell roof structure according to claim 1, wherein the solar cell module is a roofing material integrated solar cell module comprising a support means comprised of a noncombustible material.

17. A method of constructing a solar cell roof comprising a solar cell module above a roof base of a building, an electrical wire for the solar cell module provided in a space between the solar cell module and the roof base, the electrical wire being drawn into the space through a through hole provided in the roof base, the method comprising the steps of:
   providing a base sealing member on the roof base, for covering the through hole; and
   providing an exit in the base sealing member through which the electrical wire extends into the space between the solar cell module and the roof base at a portion of the base sealing member other than a portion over the through hole, wherein the base sealing member seals an opening of the through hole through which the electrical wire extends, so as to prevent air flow via the through hole between the space between the solar cell module and the roof base and a space at a back of the roof base.

18. The method according to claim 17, comprising using a plurality of sealing members as the base sealing member.

19. The method according to claim 18, wherein at least two of the plurality of sealing members comprise the same material.

20. The method according to claim 17, comprising arranging the electrical wire in the space between the solar cell module and the roof base substantially in contact with the roof base.

21. The method according to claim 17, comprising using at least first and second sealing members as the base sealing member and providing the second sealing member so as to surround the electrical wire at the peripheral portion of the through hole on the base member and to cover the through hole and the peripheral portion thereof.

22. The method according to claim 17, comprising using as the base sealing member at least a first sealing member provided at the peripheral edge portion of the through hole so as to suppress aeration through the through hole and a second sealing member covering the upside of the through hole.

23. The method according to claim 17, comprising using as the base sealing member at least a noncombustible second sealing member covering the upside of the through hole and a flame-retardant first sealing member provided in a gap between the second sealing member and the roof base.

24. The method according to claim 17, comprising using as the base sealing member at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

25. The method according to claim 24, wherein the first and the third sealing members are formed integrally.

26. The method according to claim 17, wherein at least a portion of the base sealing member comprises a heat-resisting or fire resistive material.

27. The method according to claim 17, wherein the base sealing member comprises a heat-resisting or fire resistive material.

28. The method according to claim 17, wherein at least a portion of the base sealing member has non-permeability.

29. The method according to claim 28, wherein the base sealing member comprises a non-permeable layer.

30. The method according to claim 17, wherein the roof base is inclined, and wherein the exit in the base sealing member through which the electrical wire extends into the space between the solar cell module and the roof base is provided in a direction downward the inclination with regard to the through hole.

31. The method according to claim 17, comprising arranging the electrical wire in a circular shape in and over the through hole.

32. The method according to claim 17, wherein the solar cell module is a roofing material integrated solar cell module comprising a support means comprised of a noncombustible material.

33. A photovoltaic power generating apparatus, comprising:
a solar cell module above a roof base of a building;
an electrical wire for the solar cell module provided in a space between the solar cell module and the roof base, the electrical wire extending into the space through a through hole provided in the roof base; and
a base sealing member on the roof base, for covering the through hole, wherein
an exit in the base sealing member through which the electrical wire extends into the space between the solar cell module and the roof base is provided at a portion of the base sealing member other than a portion over the through hole, and wherein
the base sealing member seals an opening of the through hole through which the electrical wire extends, so as to prevent air flow via the through hole between the space between the solar cell module and the roof base and a space at a back of the roof base.

34. The apparatus according to claim 33, wherein the base sealing member comprises a plurality of sealing members.

35. The apparatus according to claim 34, wherein at least two of the plurality of sealing members comprise the same material.

36. The apparatus according to claim 33, wherein the electrical wire between the solar cell module and the through hole is substantially in contact with the roof base.

37. The apparatus according to claim 33, wherein the base sealing member comprises at least first and second sealing members, and wherein the second sealing member surrounds the electrical wire at the peripheral portion of the through hole on the base member and covers the through hole and the peripheral portion thereof.

38. The apparatus according to claim 33, wherein the base sealing member comprises at least a first sealing member provided at the peripheral edge portion of the through hole so as to suppress aeration through the through hole and a second sealing member covering the upside of the through hole.

39. The apparatus according to claim 33, wherein the base sealing member comprises at least a noncombustible second sealing member covering the upside of the through hole and a flame-retardant first sealing member provided in a gap between the second sealing member and the roof base.

40. The apparatus according to claim 33, wherein the base sealing member comprises at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

41. The apparatus according to claim 40, wherein the first and the third sealing members are formed integrally.

42. The apparatus according to claim 33, wherein at least a portion of the base sealing member comprises a heat-resisting or fire resistive material.

43. The apparatus according to claim 33, wherein the base sealing member comprises a heat-resisting or fire resistive material.

44. The apparatus according to claim 33, wherein at least a portion of the base sealing member has non-permeability.

45. The apparatus according to claim 44, wherein the base sealing member comprises a non-permeable layer.

46. The apparatus according to claim 33, wherein the roof base is inclined, and wherein the exit in the base sealing member through which the electrical wire extends into the space between the solar cell module and the roof base is provided in a direction downward the inclination with regard to the through hole.

47. The apparatus according to claim 33, wherein the electrical wire is arranged in a circular shape in and over the through hole.

48. The apparatus according to claim 33, wherein the solar cell module is a roofing material integrated solar cell module comprising a support means comprised of a noncombustible material.

49. A building, comprising:
a solar cell module above a roof base of the building;
an electrical wire for the solar cell module provided in a space between the solar cell module and the roof base, the electrical wire extending into the space through a through hole provided in the roof base; and
a base sealing member on the roof base, for covering the through hole, wherein
an exit in the base sealing member through which the electrical wire extends into the space between the solar cell module and the roof base is provided at a portion of the base sealing member other than a portion over the through hole, and wherein
the base sealing member seals an opening of the through hole through which the electrical wire extends into the space, so as to prevent air flow via the through hole between the space between the solar cell module and the roof base and a space at a back of the roof base.

50. The building according to claim 49, wherein the base sealing member comprises a plurality of sealing members.

51. The building according to claim 50, wherein at least two of the plurality of sealing members comprise the same material.

52. The building according to claim 49, wherein the electrical wire provided in the space between the solar cell module and the roof base is substantially in contact with the roof base.

53. The building according to claim 49, wherein the base sealing member comprises at least first and second sealing members, and wherein the second sealing member surrounds the electrical wire at the peripheral portion of the through hole on the base member and covers the through hole and the peripheral portion thereof.

54. The building according to claim 49, wherein the base sealing member comprises at least a first sealing member provided at the peripheral edge portion of the through hole so as to suppress aeration through the through hole and a second sealing member covering the upside of the through hole.

55. The building according to claim 49, wherein the base sealing member comprises at least a noncombustible second sealing member covering the upside of the through hole and a flame-retardant first sealing member provided in a gap between the second sealing member and the roof base.

56. The building according to claim 49, wherein the base sealing member comprises at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

57. The building according to claim 56, wherein the first and the third sealing members are formed integrally.

58. The building according to claim 49, wherein at least a portion of the base sealing member comprises a heat-resisting or fire resistive material.

59. The building according to claim 49, wherein the base sealing member comprises a heat-resisting or fire resistive material.

60. The building according to claim 49, wherein at least a portion of the base sealing member has non-permeability.

61. The building according to claim 60, wherein the base sealing member comprises a non-permeable layer.

62. The building according to claim 49, wherein the roof base is inclined, and wherein the exit in the base sealing member through which the electrical wire extends into the space between the solar cell module and the roof base is provided in a direction downward the inclination with regard to the through hole.

63. The building according to claim 49, wherein the electrical wire is arranged in a circular shape in and over the through hole.

64. The building according to claim 49, wherein the solar cell module is a roofing material integrated solar cell module comprising a support means comprised of a noncombustible material.

65. A solar cell roof structure, comprising:
a solar cell module above a roof base of a building;
an electrical wire for the solar cell module provided in a space between the solar cell module and the roof base, the electrical wire extending into the space through a through hole provided in the roof base; and
a base sealing member comprising a fire resistive material and covering the through hole and at least a portion at a periphery of the through hole so as to prevent air flow via the through hole between the space between the solar cell module and the roof base and a space at a back of the roof base.

66. The solar cell roof structure according to claim 65, wherein the base sealing member comprises a plurality of sealing members.

67. The solar cell roof structure according to claim 66, wherein at least two of the plurality of sealing members comprise the same material.

68. The solar cell roof structure according to claim 65, wherein the electrical wire provided in the space between the solar cell module and the roof base is substantially in contact with the roof base.

69. The solar cell roof structure according to claim 65, wherein the base sealing member comprises at least first and second sealing members, and wherein the second sealing member surrounds the electrical wire at the peripheral portion of the through hole on the base member and covers the through hole and the peripheral portion thereof.

70. The solar cell roof structure according to claim 65, wherein the base sealing member comprises at least a first sealing member provided at the peripheral edge portion of the through hole so as to suppress aeration through the through hole and a second sealing member covering the upside of the through hole.

71. The solar cell roof structure according to claim 65, wherein the base sealing member comprises at least a noncombustible second sealing member covering the upside of the through hole and a flame-retardant first sealing member provided in a gap between the second sealing member and the roof base.

72. The solar cell roof structure according to claim 65, wherein the base sealing member comprises at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

73. The solar cell roof structure according to claim 72, wherein the first and the third sealing members are formed integrally.

74. The solar cell roof structure according to claim 65, wherein at least a portion of the base sealing member has non-permeability.

75. The solar cell roof structure according to claim 74, wherein the base sealing member comprises a non-permeable layer.

76. The solar cell roof structure according to claim 65, wherein the roof base is inclined, and wherein the exit in the base sealing member through which the electrical wire extends into the space between the solar cell module and the roof base is provided in a direction downward the inclination with regard to the through hole.

77. The solar cell roof structure according to claim 65, wherein the electrical wire is arranged in a circular shape in and over the through hole.

78. The solar cell roof structure according to claim 65, wherein the solar cell module is a roofing material integrated solar cell module comprising a support means comprised of a noncombustible material.

79. A method of constructing a solar cell roof comprising a solar cell module above a roof base of a building, an electrical wire for the solar cell module provided in a space between the solar cell module and the roof base, the electrical wire being drawn into the space through a through hole provided in the roof base, the method comprising the step of providing a base sealing member which is comprised of a fire resistive material and which covers the through hole and at least a portion at a periphery of the through hole so as to prevent air flow via the through hole between the space between the solar cell module and the roof base and a space at a back of the roof base.

80. The method according to claim 79, comprising using a plurality of sealing members as the base sealing member.

81. The method according to claim 80, wherein at least two of the plurality of sealing members comprise the same material.

82. The method according to claim 79, comprising arranging the electrical wire in the space between the solar cell module and the roof base substantially in contact with the roof base.

83. The method according to claim 79, comprising using at least first and second sealing members as the base sealing member and providing the second sealing member so as to surround the electrical wire at the peripheral portion of the through hole on the base member and to cover the through hole and the peripheral portion thereof.

84. The method according to claim 79, comprising using as the base sealing member at least a first sealing member provided at the peripheral edge portion of the through hole so as to suppress aeration through the through hole and a second sealing member covering the upside of the through hole.

85. The method according to claim 79, comprising using as the base sealing member at least a noncombustible second sealing member covering the upside of the through hole and a flame-retardant first sealing member provided in a gap between the second sealing member and the roof base.

86. The method according to claim 79, comprising using as the base sealing member at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

87. The method according to claim 86, wherein the first and the third sealing members are formed integrally.

88. The method according to claim 79, wherein at least a portion of the base sealing member has non-permeability.

89. The method according to claim 88, wherein the base sealing member comprises a non-permeable layer.

90. The method according to claim 79, wherein the roof base is inclined, and wherein the exit in the base sealing member through which the electrical wire extends into the space between the solar cell module and the roof base is provided in a direction downward the inclination with regard to the through hole.

91. The method according to claim 79, comprising arranging the electrical wire in a circular shape in and over the through hole.

92. The method according to claim 79, wherein the solar cell module is a roofing material integrated solar cell module comprising a support means comprised of a noncombustible material.

93. A photovoltaic power generating apparatus, comprising:
    a solar cell module above a roof base of a building;
    an electrical wire for the solar cell module provided in a space between the solar cell module and the roof base, the electrical wire extending into a space at the back of the roof base through a through hole provided in the roof base; and
    a base sealing member comprised of a fire-resistive material and covering the through hole and at least a portion at a periphery of the through hole so as to prevent air flow via the through hole between the space between the solar cell module and the roof base and the space at the back of the roof base.

94. The apparatus according to claim 93, wherein the base sealing member comprises a plurality of sealing members.

95. The apparatus according to claim 94, wherein at least two of the plurality of sealing members comprise the same material.

96. The apparatus according to claim 93, wherein the electrical wire provided in the space between the solar cell module and the roof base is substantially in contact with the roof base.

97. The apparatus according to claim 93, wherein the base sealing member comprises at least first and second sealing members, and wherein the second sealing member surrounds the electrical wire at the peripheral portion of the through hole on the base member and covers the through hole and the peripheral portion thereof.

98. The apparatus according to claim 93, wherein the base sealing member comprises at least a first sealing member provided at the peripheral edge portion of the through hole so as to suppress aeration through the through hole and a second sealing member covering the upside of the through hole.

99. The apparatus according to claim 93, wherein the base sealing member comprises at least a noncombustible second sealing member covering the upside of the through hole and a flame-retardant first sealing member provided in a gap between the second sealing member and the roof base.

100. The apparatus according to claim 93, wherein the base sealing member comprises at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

101. The apparatus according to claim 100, wherein the first and the third sealing members are formed integrally.

102. The apparatus according to claim 93, wherein at least a portion of the base sealing member has non-permeability.

103. The apparatus according to claim 102, wherein the base sealing member comprises a non-permeable layer.

104. The apparatus according to claim 93, wherein the roof base is inclined, and wherein the exit in the base sealing member through which the electrical wire extends into the space between the solar cell module and the roof base is provided in a direction downward the inclination with regard to the through hole.

105. The apparatus according to claim 93, wherein the electrical wire is arranged in a circular shape in and over the through hole.

106. The apparatus according to claim 93, wherein the solar cell module is a roofing material integrated solar cell module comprising a support means comprised of a non-combustible material.

107. A building, comprising:
 a solar cell module above a roof base of the building;
 an electrical wire for the solar cell module provided in a space between the solar cell module and the roof base, the electrical wire extending into a space at the back of the roof base through a through hole provided in the roof base; and
 a base sealing member comprising a fire resistive material and covering the through hole and at least a portion at a periphery of the through hole so as to prevent air flow via the through hole between the space between the solar cell module and the roof base and the space at the back of the roof base.

108. The building according to claim 107, wherein the base sealing member comprises a plurality of sealing members.

109. The building according to claim 108, wherein at least two of the plurality of sealing members comprise the same material.

110. The building according to claim 107, wherein the electrical wire provided in the space between the solar cell module and the roof base is substantially in contact with the roof base.

111. The building according to claim 107, wherein the base sealing member comprises at least first and second sealing members, and wherein the second sealing member surrounds the electrical wire at the peripheral portion of the through hole on the base member and covers the through hole and the peripheral portion thereof.

112. The building according to claim 107, wherein the base sealing member comprises at least a first sealing member provided at the peripheral edge portion of the through hole so as to suppress aeration through the through hole and a second sealing member covering the upside of the through hole.

113. The building according to claim 107, wherein the base sealing member comprises at least a noncombustible second sealing member covering the upside of the through hole and a flame-retardant first sealing member provided in a gap between the second sealing member and the roof base.

114. The building according to claim 107, wherein the base sealing member comprises at least a second sealing member covering the upside of the through hole, a first sealing member arranged at a peripheral portion of the through hole at the roof base side of the electrical wire, and a third sealing member arranged at a peripheral portion of the through hole at the solar cell module side of the electrical wire.

115. The building according to claim 114, wherein the first and the third sealing members are formed integrally.

116. The building according to claim 107, wherein at least a portion of the base sealing member has non-permeability.

117. The building according to claim 116, wherein the base sealing member comprises a non-permeable layer.

118. The building according to claim 107, wherein the roof base is inclined, and wherein the exit in the base sealing member through which the electrical wire extends into the space between the solar cell module and the roof base is provided in a direction downward the inclination with regard to the through hole.

119. The building according to claim 107, wherein the electrical wire is arranged in a circular shape in and over the through hole.

120. The building according to claim 107, wherein the solar cell module is a roofing material integrated solar cell module comprising a support means comprised of a non-combustible material.

121. The solar cell roof structure according to claim 1 or 65, wherein the base sealing member is deformable.

122. The method according to claim 17 or 79, wherein the base sealing member is deformable.

123. The apparatus according to claim 33 or 93, wherein the base sealing member is deformable.

124. The building according to claim 49 or 107, wherein the base sealing member is deformable.

125. The solar cell roof structure according to claim 1 or 65, wherein the base sealing member is comprised of a material which sets with the lapse of time.

126. The method according to claim 17 or 79, wherein the base sealing member is comprised of a material which sets with the lapse of time.

127. The apparatus according to claim 33 or 93, wherein the base sealing member is comprised of a material which sets with the lapse of time.

128. The building according to claim 49 or 107, wherein the base sealing member is comprised of a material which sets with the lapse of time.

129. The solar cell roof structure according to claim 1 or 65, wherein at least a part of the base sealing member is present between the peripheral portion of the through hole and the electrical wire so that the edge portion of the through hole and the electrical wire are not in contact with each other.

130. The method according to claim 17 or 79, wherein at least a part of the base sealing member is present between the peripheral portion of the through hole and the electrical wire so that the edge portion of the through hole and the electrical wire are not in contact with each other.

131. The apparatus according to claim 33 or 93, wherein at least a part of the base sealing member is present between the peripheral portion of the through hole and the electrical wire so that the edge portion of the through hole and the electrical wire are not in contact with each other.

132. The building according to claim 49 or 107, wherein at least a part of the base sealing member is present between the peripheral portion of the through hole and the electrical wire so that the edge portion of the through hole and the electrical wire are not in contact with each other.

133. The solar cell roof structure according to claim 1 or 65, wherein the base sealing member will withstand a temperature higher than the melting point of the electrical wire.

134. The method according to claim 17 or 79, wherein the base sealing member will withstand a temperature higher than the melting point of the electrical wire.

135. The apparatus according to claim 33 or 93, wherein the base sealing member will withstand a temperature higher than the melting point of the electrical wire.

136. The building according to claim 49 or 107, wherein the base sealing member will withstand a temperature higher than the melting point of the electrical wire.

137. The solar cell roof structure according to claim 1 or 65, wherein the base sealing member will withstand a temperature higher than the temperature at which wood ignites.

138. The method according to claim 17 or 79, wherein the base sealing member will withstand a temperature higher than the temperature at which wood ignites.

139. The apparatus according to claim 33 or 93, wherein the base sealing member will withstand a temperature higher than the temperature at which wood ignites.

140. The building according to claim 49 or 107, wherein the base sealing member will withstand a temperature higher than the temperature at which wood ignites.

* * * * *

UNITED STATES PATENT AND TRADEMARK OFFICE
CERTIFICATE OF CORRECTION

PATENT NO. : 6,576,830 B2
DATED : June 10, 2003
INVENTOR(S) : Yoshitaka Nagao et al.

It is certified that error appears in the above-identified patent and that said Letters Patent is hereby corrected as shown below:

<u>Title page,</u>
Item [*] Notice, insert the following:
-- This patent issued on a continued prosecution application filed under 37 CFR 1.53(d), and is subject to the twenty year patent term provisions of U.S.C. 1.54(a)(2). --.

Item [56], References Cited, FOREIGN PATNET DOCUMENTS, "2565611" should read -- 8-256561 --.

<u>Column 10,</u>
Line 25, "each" should read -- with each --.

<u>Column 12,</u>
Lines 15 and 61, "each" should read -- with each --.

Signed and Sealed this

Twenty-seventh Day of January, 2004

JON W. DUDAS
*Acting Director of the United States Patent and Trademark Office*